United States Patent [19]

Battisti et al.

[11] 4,216,145

[45] Aug. 5, 1980

[54] WATER-INSOLUBLE MONO-AZO YELLOW DYES DERIVED FROM 1-PHENYL-3-AMINOPYRAZOLES

[75] Inventors: Ruggero Battisti; Gioacchino Boffa; Nicola Mazzaferro, all of Novara; Angelo Mangini; Antonio Tundo, both of Bologna, all of Italy

[73] Assignee: Montedison S.p.A., Milan, Italy

[21] Appl. No.: 809,848

[22] Filed: Jun. 24, 1977

[30] Foreign Application Priority Data

Jun. 25, 1976 [IT] Italy .................................. 24717 A/76

[51] Int. Cl.² ............................................. C07B 29/34
[52] U.S. Cl. ........................................ 260/156; 8/662
[58] Field of Search ......................................... 260/156

[56] References Cited

U.S. PATENT DOCUMENTS 2,972,508  2/1961  Kruckenberg ................... 260/205 X

FOREIGN PATENT DOCUMENTS 1901711  4/1970  Fed. Rep. of Germany ........... 260/156

OTHER PUBLICATIONS

Lubs, *The Chemistry of Synthetic Dyes and Pigments*, Reinhold Publishing Corp: New York, 1955, pp. 670–671.

*Primary Examiner*—Arthur P. Demers

[57] ABSTRACT

New yellow mono-azo dyes which are insoluble in water are disclosed. The dyes are derived from 1-phenyl-3-aminopyrazoles and are particularly effective in dyeing synthetic hydrophobic fibers to intense yellow shades.

14 Claims, No Drawings

WATER-INSOLUBLE MONO-AZO YELLOW DYES DERIVED FROM 1-PHENYL-3-AMINOPYRAZOLES

THE PRIOR ART

Although dyes derived from cyano-pyridone are known in the art, no prior description of the particular dyes disclosed herein is known to applicants.

THE PRESENT INVENTION

An object of this invention is to provide new waterinsoluble dyes, particularly for dyeing and printing synthetic hydrophobic fibers to yellow shades which are intense and bright.

This and other objects are achieved by the dyes of the present invention and which have the general formula

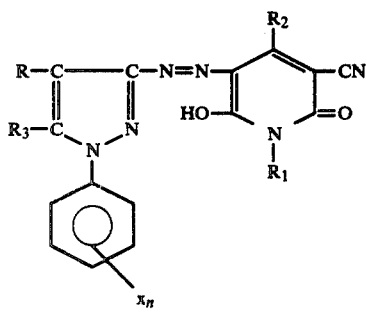

in which
R is H or $CH_3$;
$R_1$ is $CH_3$ or $C_2H_5$;
$R_2$ is $CH_3$, $C_2H_5$ or $C_3H_7$;
$R_3$ is H or phenyl;
X is H, Br, Cl, or an alkyl, alkoxyl or carboxyalkyl group containing from 1 to 4 carbon atoms, $CF_3$ or CN; and
n is 1, 2 or 3.

The dyes of formula (I) are prepared under substantially conventional conditions by diazotization of 1-phenyl-3-aminopyrazoles of the formula

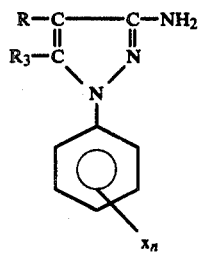

followed by coupling in a basic medium on N-alkyl-6-hydroxy-4-alkyl-3-cyano-2-pyridones of the general formula:

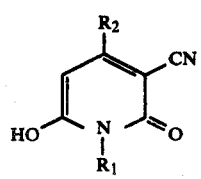

In formulae (II) and (III), R, $R_1$, $R_2$, $R_3$, X and n have the same meaning as in formula (I).

The 1-phenyl-3-aminopyrazoles of formula (II) can be prepared by conventional methods, for example by condensation of phenylhydrazines with acrylonitrile to obtain 1-phenyl-3-amino-2-pyrazolines, and dehydrogenation of the latter to the 1-phenyl-3-aminopyrazoles.

The N-alkyl-6-hydroxy-4-alkyl-3-cyano-2-pyridones of formula (III) can be obtained (for instance when R is $CH_3$) by condensation of ethyl cyanoacetate, ethyl acetoacetate and N-alkylamines, according to conventional techniques.

The dyes of this invention, of formula (I), are particularly useful in dyeing and printing yellow the synthetic hydrophobic fibers, especially the polyester fibers. When applied according to conventional dyeing and printing methods, they dye and print such materials intense and bright yellow shades that have excellent stability, particularly to sunlight and sublimation.

The following examples are given to illustrate the invention in more detail, and are not intended to be limiting.

EXAMPLE 1

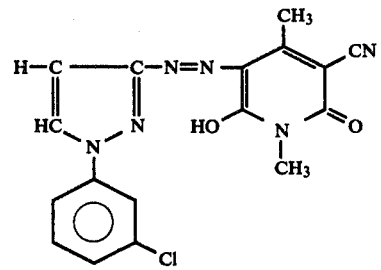

19.35 g (0.1 mole) of 1-(m-chlorophenyl)-3-aminopyrazole were dissolved in 400 ml of $H_2O$ containing 35 g of HCl at 22° Be, and were diazotized at a temperature between 0 and 5° C. with a solution of 7.5 g of $NaNO_2$ in 50 ml of $H_2O$. The diazo derivative solution was dropped into a solution consisting of 16.4 g (0.1 mole) of 1-methyl-3-cyano-4-methyl-6-hydroxy-2-pyridone, of 400 ml of $H_2O$ and of 50 g of NaOH at 35° Be, kept at 0–5° C. At the conclusion of the addition, the whole was stirred for 30 minutes and then acidified with HCl, whereupon the resulting dye was filtered and washed with water to neutrality. After drying, a yellow powder was obtained, having a melting point of 252–253° C. and exhibiting the following centesimal analysis:

calculated (for $C_{17}H_{13}ClN_6O_2$): C%=55.36; H%=3.53; N%=22.79 found: 55.26; 3.49 22.67.

EXAMPLE 2 (Dyeing of Polyester Test)

In an apparatus for dyeing under pressure, 100 g of a polyester fabric, previously scoured, were treated for 10-15 minutes in a 2-liter dyeing bath at 50° C. containing 2 g/l of ammonium sulphate and 1 g/l of Emulson ELU (a non-ionogenic surfactant produced by Montedison). 1 g of dyestuff, prepared according to Example 1, previously dispersed and filtered through a screen, was added and the bath was brought to a pH value of 5.5 with formic acid. It was heated in 20–30 minutes up to 90° C., then temperature was gradually raised to 130° C. and kept at that value for 60 minutes.

At the conclusion of the dyeing, the bath was cooled to 80–85° C. and discharged. The fabric was rinsed and an alkaline reducing treatment was effected for 20 minutes at 80° C. by means of a bath containing 2 ml/l of NaOH at 35° Be, 2 g/l of Albite A ($Na_2S_2O_4$ at 85%) and 0.5 g/l of DIAPAL CW (a non-ionogenic detergent, produced by Montedison). The fabric was repeatedly rinsed and then dried. It was dyed to an intense yellow shade and the dye exhibited excellent stability to sunlight, to wet conditions and to thermal treatments.

Following the same modalities as described in the preceding examples, dyes were prepared and dyeings and printings were obtained having the characteristics reported in the following table.

TABLE

| Ex. | Dye | Shade on Polyester |
|---|---|---|
| 3 | (structure) | yellow |
| 4 | (structure) | yellow |
| 5 | (structure) | yellow |
| 6 | (structure) | yellow |
| 7 | (structure) | yellow |
| 8 | (structure) | yellow |
| 9 | (structure) | yellow |
| 10 | (structure) | yellow |
| 11 | (structure) | yellow |
| 12 | (structure) | yellow |
| 13 | (structure) | yellow |

TABLE-continued

| Ex. | Dye | Shade on Polyester |
|---|---|---|
| 14 | [structure: pyrazole with phenyl substituents, azo-linked to methylpyridone with CN, CH3, HO, N-CH3] | yellow |

What we claim is:

1. A water-soluble yellow monoazo dye, having the formula:

[Structure (I): pyrazole ring with R, R3 substituents and N-phenyl (with Xn substituents) linked via azo group to pyridone ring bearing R2, CN, HO, and N-R1]

in which
R is H or CH3;
R1 is CH3 or C2H5;
R2 is CH3, C2H5, or C3H7;
R3 is H or phenyl;
X is H, Br, Cl, alkyl of 1 to 4 carbon atoms, alkoxy of 1 to 4 carbon atoms, carboxyalkyl of 1 to 4 carbon atoms, CF3 or CN; and
n is 1, 2 or 3.

2. A water insoluble yellow monoazo dye, according to claim 1 and having the formula:

[Structure with 3-chlorophenyl pyrazole]

3. A water-insoluble yellow monoazo dye according to claim 1, and having the formula:

[Structure with 2-chlorocyclohexyl group]

4. A water-insoluble yellow monoazo dye according to claim 1, and having the formula:

[Structure with 2,4-dichlorocyclohexyl group]

5. A water-insoluble yellow monoazo dye according to claim 1, and having the formula:

[Structure with 3,4-dichlorocyclohexyl group]

6. A water-insoluble yellow monoazo dye according to claim 1, and having the formula:

[Structure with 3-trifluoromethylcyclohexyl group]

7. A water-insoluble yellow monoazo dye according to claim 1, and having the formula:

[Structure with cyclohexyl group]

8. A water-insoluble yellow monoazo dye according to claim 1, and having the formula:

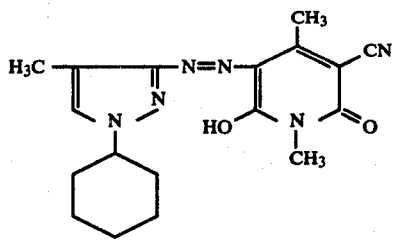

9. A water-insoluble yellow monoazo dye according to claim 1, and having the formula:

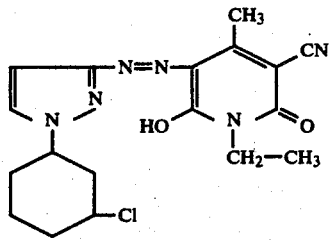

10. A water-insoluble yellow monoazo dye according to claim 1, and having the formula:

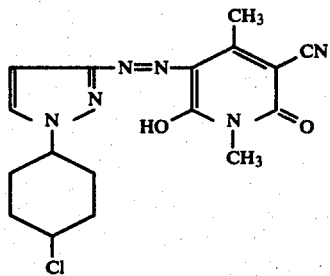

11. A water-insoluble yellow monoazo dye according to claim 1, and having the formula:

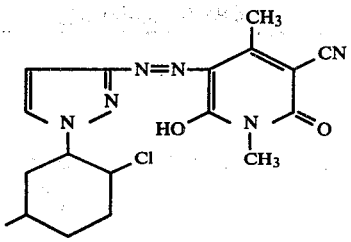

12. A water-insoluble yellow monoazo dye according to claim 1, and having the formula:

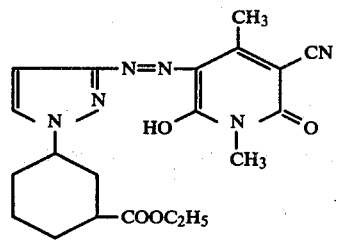

13. A water-insoluble yellow monoazo dye according to claim 1, and having the formula:

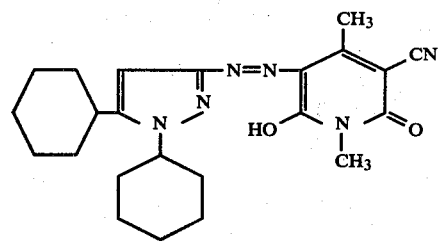

14. A water-insoluble yellow monoazo dye according to claim 1, and having the formula:

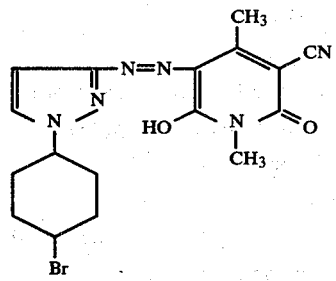

* * * * *